(12) United States Patent
Baio et al.

(10) Patent No.: US 7,676,449 B2
(45) Date of Patent: Mar. 9, 2010

(54) CREATING AND VIEWING PRIVATE EVENTS IN AN EVENTS REPOSITORY

(75) Inventors: Andrew Baio, Palo Alto, CA (US); Gordon Luk, Sunnyvale, CA (US); Leonard H. Lin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

(21) Appl. No.: 11/391,933

(22) Filed: Mar. 28, 2006

(65) Prior Publication Data

US 2007/0260636 A1 Nov. 8, 2007

(51) Int. Cl.
*G06F 7/00* (2006.01)
(52) U.S. Cl. ............... 707/1; 707/104.1; 726/26
(58) Field of Classification Search ........... 707/104.1, 707/102
See application file for complete search history.

(56) References Cited

U.S. PATENT DOCUMENTS

| | | | |
|---|---|---|---|
| 6,018,343 A | 1/2000 | Wang et al. | |
| 6,088,717 A * | 7/2000 | Reed et al. ............ | 709/201 |
| 6,216,110 B1 | 4/2001 | Silverberg | |
| 6,369,840 B1 | 4/2002 | Barnett et al. | |
| 6,546,188 B1 | 4/2003 | Ishii et al. | |
| 6,684,385 B1 | 1/2004 | Bailey et al. | |
| 6,768,994 B1 * | 7/2004 | Howard et al. ............ | 707/10 |
| 6,802,054 B2 | 10/2004 | Faraj | |
| 6,823,357 B1 | 11/2004 | Du et al. | |
| 6,934,740 B1 | 8/2005 | Lawande et al. | |
| 6,966,065 B1 | 11/2005 | Kitazato et al. | |
| 7,174,517 B2 | 2/2007 | Barnett et al. | |
| 2003/0033296 A1 | 2/2003 | Rothmuller et al. | |
| 2003/0200192 A1 * | 10/2003 | Bell et al. ............ | 707/1 |
| 2003/0225732 A1 | 12/2003 | Chan et al. | |
| 2004/0128169 A1 * | 7/2004 | Lusen ............ | 705/3 |
| 2004/0133544 A1 * | 7/2004 | Kiessig et al. ............ | 707/1 |
| 2005/0120009 A1 * | 6/2005 | Aker ............ | 707/3 |
| 2005/0197894 A1 | 9/2005 | Fairbanks et al. | |
| 2005/0262164 A1 | 11/2005 | Guiheneuf et al. | |
| 2005/1028964 * | 12/2005 | Pacholec et al. ............ | 726/4 |
| 2006/0224615 A1 * | 10/2006 | Korn et al. ............ | 707/102 |
| 2006/0253456 A1 * | 11/2006 | Pacholec et al. ............ | 707/10 |
| 2007/0011147 A1 * | 1/2007 | Falkenberg ............ | 707/3 |
| 2007/0043688 A1 * | 2/2007 | Kountz et al. ............ | 707/1 |
| 2007/0053513 A1 | 3/2007 | Hoffberg | |
| 2007/0162322 A1 | 7/2007 | Shahine et al. | |
| 2007/0185835 A1 * | 8/2007 | Ursitti et al. ............ | 707/3 |
| 2007/0198939 A1 | 8/2007 | Gold | |
| 2007/0239761 A1 * | 10/2007 | Baio et al. ............ | 707/102 |
| 2008/0065599 A1 * | 3/2008 | Baio et al. ............ | 707/3 |
| 2008/0065740 A1 * | 3/2008 | Baio et al. ............ | 709/217 |
| 2008/0104032 A1 * | 5/2008 | Sarkar ............ | 707/3 |

* cited by examiner

*Primary Examiner*—Pierre M Vital
*Assistant Examiner*—Christopher P Nofal
(74) *Attorney, Agent, or Firm*—Hickman Palermo Truong & Becker LLP

(57) ABSTRACT

Techniques for accessing an events information repository are provided. An events repository contains event records defining real world events. A programmatic interface is exposed to third-party applications for accessing the event records within the repository. Specifically, the programmatic interface provides a set of routines that perform operations on the repository. Using the programmatic interface, third-party applications may call the set of routines to cause operations to be executed on the repository. Further, techniques are provided for creating and viewing private events within an events repository and also for associating user-defined tags with events using the events repository.

14 Claims, 18 Drawing Sheets

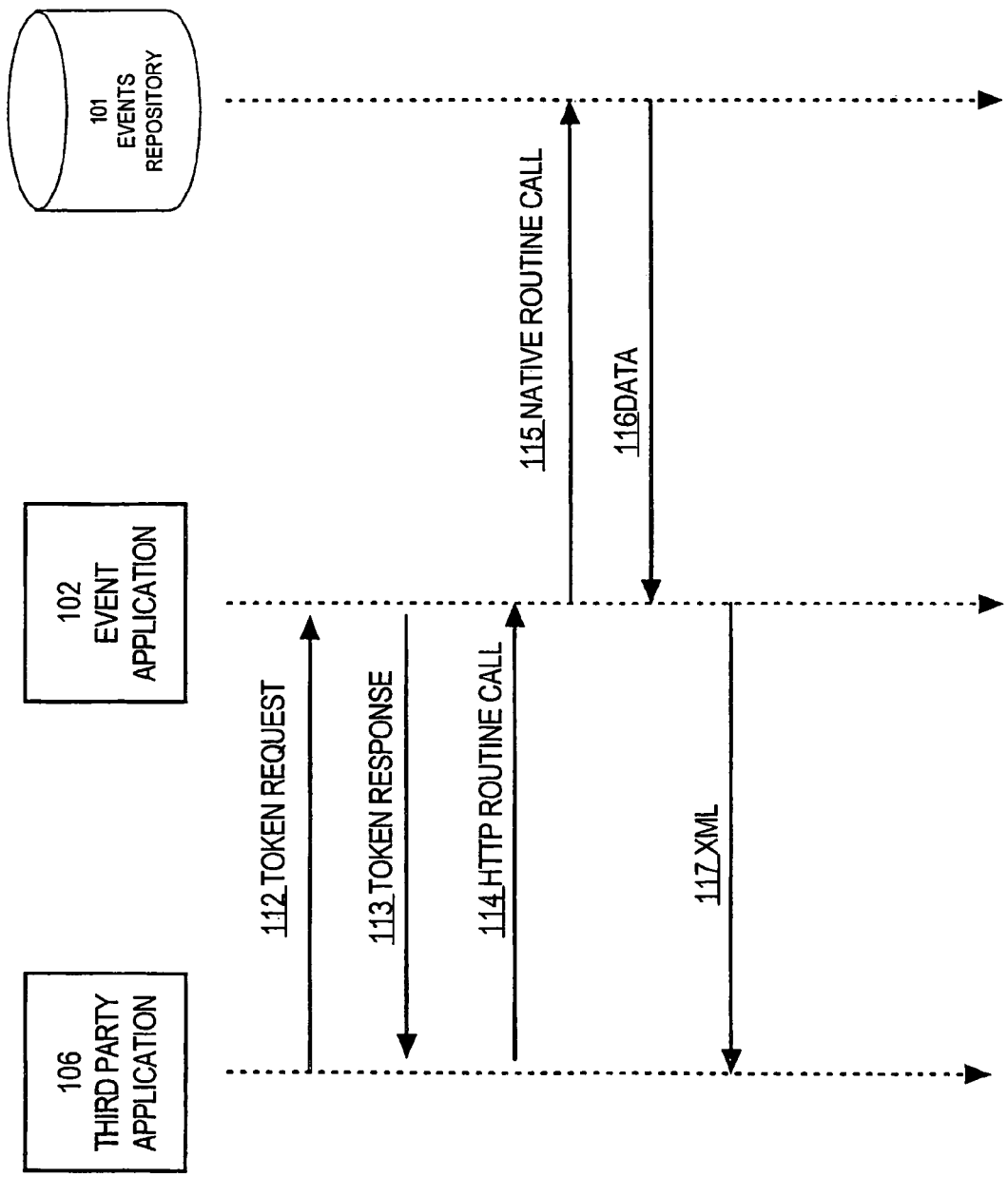

FIG. 2A

FIG. 2C upcoming.org

Home | Events | Friends | Tags | Metros | Groups | Venues | Popular    My Settings | Help | Logout a YAHOO! company k7lim

Name: Kevin Lim
Add to My Friends list
http://condimentking.com

Flag User for Review k7lim's Metros

Berkeley
Palo Alto
San Francisco
San Francisco Bay Area
San Francisco East Bay k7lim's Upcoming Events (Past Events...)

| Date | Event Name | Status | Comments | People |
|---|---|---|---|---|
| Mar 23 | blasthaus presents VITALIC (live!) | Watch | 0 | 12 |
| Mar 23 | Tapes 'n Tapes w/ Blackbud 18+ | Attend | 0 | 10 |
| Mar 24 | Clap Your Hands Say Yeah | Attend | 0 | 51 |
| Mar 27 | [Noise Pop 2006] Flaming Lips @ Bimbos | Attend | 4 | 23 |
| Mar 29 | Britt Daniel (Of Spoon) | Watch | 2 | 23 |
| Mar 30 | Kieran Hebden (AKA Four Tet) and Steve Reid | Watch | 0 | 13 |

Upcoming Badges [NEW!]

Publish your events on your own website with a new Upcoming Badge!

What's New?

Aw, no activity since your last login. Try adding comments to events your friends are watching to get things started!

See all recent updates

Site News XML

January 18, 2006
So, you might have noticed a few small changes around here over the past few days.... The biggest are the recent activity, social network browsing, and the new token-based API authentication. [Read More...]
18 comments

FIG. 2D

| k7lim's Friends | k7lim's Friends' Events | | |
|---|---|---|---|
| Date | Metro | Event Name | Friends |
| Mar 23 | New York City | Small Sins, Youth Group, Amusement Parks on Fir... | kathrynyu |
| Mar 24 | New York City | Love Is All, caUSE co-MOTION! | kathrynyu |
| Mar 25 | New York City | Joggers, Georgie James, Lolita Bras | kathrynyu |
| Mar 26 | New York City | Ted Leo/Pharmacists, The Duke Spirit, Les Aus | kathrynyu |
| Mar 27 | New York City | Koester, The M's, Joemca & Poets, Seth Adam | kathrynyu |
| Mar 28 | New York City | The Magic Numbers, The Elected | kathrynyu |
| Mar 28 | New York City | What Made Milwakee Famous, Thank You Goodnight,... | kathrynyu |
| Mar 29 | New York City | Th' Faith Healers, What Made Milwaukee Famous, ... | kathrynyu |
| Mar 30 | New York City | I Love You But I've Chosen Darkness, Hail Soda... | kathrynyu |
| Mar 31 | New York City | Bishop Allen, Elizabeth Harper, Benjamin Wagner... | kathrynyu |
| Mar 31 | New York City | An evening with David Sedaris | kathrynyu |
| Apr 01 | New York City | Dr. Earnest Parrot presents Demetri Martin | kathrynyu |
| Apr 02 | New York City | Centro-matic, Great Lake Swimmers | kathrynyu |
| Apr 05 | New York City | Art Brut | kathrynyu |
| Apr 06 | New York City | RAHIM + Foreign Islands + Other Passengers + El... | kathrynyu |
| Apr 07 | New York City | Neko Case, The High Dials | kathrynyu |
| Apr 09 | New York City | Voxtrot, Irving, New Sense, The Glass Family | kathrynyu |
| Apr 10 | New York City | Voxtrot, Irving, Aloha, Magneta Lane | kathrynyu |
| Apr 17 | San Francisco | The Books | thincvox |
| Apr 22 | San Francisco Bay Area | Bay Area Maker Faire | thincvox |
| Apr 22 | New York City | Taste of Chinatown | kathrynyu |
| Apr 27 | New York City | John Vanderslice, Death Vessel, Wooden Wand | kathrynyu |
| Apr 28 | New York City | Fruit Bats, Amandine, Sam Jayne | kathrynyu |

FIG. 2E upcoming.org

Home | Events | Friends | Tags | Metros | Users | Groups | Venues | Popular

My Settings | Help | Logout a YAHOO! company

Search All Users

[Search]

You can keep track of the events your friends are watching or attending here or on the homepage.

| My Friends | My Fans | My Friends' Events | | |
|---|---|---|---|---|
| Date | Metro | Event Name | | |
| Mar 22+ | Seattle | The 2006 Nonprofit Technology Conference | | FullCalendar |
| Mar 22+ | San Francisco Bay Area | TechLeaders: Realizing Your Vision | | FullCalendar |
| Mar 22 | San Francisco Bay Area | VCTF: What's IP Got to Do with It? Evaluation,... | | FullCalendar |
| Mar 23 | San Francisco Bay Area | SDForum International SIG: Tales from the Globa... | | FullCalendar |
| Mar 23 | San Francisco Bay Area | Blogging for Business: An Insider's Look at How... | | FullCalendar |
| Mar 24 | San Francisco Bay Area | Talking Your Walk: Getting Value Propositions R... | | FullCalendar |
| Mar 25 | San Francisco Bay Area | Intel Museum - Free Saturday Program Engages Ki... | | FullCalendar |
| Mar 27 | San Francisco Bay Area | Application Deadline for 4/20 SDForum Legal Coa... | | FullCalendar |
| Mar 28 | San Jose | SDForum Web Services SIG: The Role of the Servi... | | FullCalendar |
| Apr 03+ | San Francisco | Healing Force: A Group Exhibition of Visual Aid... | | FullCalendar |
| Apr 04 | San Francisco Bay Area | Getting to the Top - Getting Unstuck | | FullCalendar |
| Apr 05+ | San Francisco Bay Area | Ceres Conference 2006 | | FullCalendar |

Upcoming Badges [NEW!]

Publish your events on your own website with a new Upcoming Badge!

What's New?

Aw, no activity since your last login. Try adding comments to events your friends are watching to get things started!

See all recent updates

Site News XML

January 18, 2006
So, you might have noticed a few small changes around here over the past few days... The biggest are the recent activity, social network browsing, and the new token-based API authentication. [Read More...]
18 comments

FIG. 2F upcoming
a YAHOO! company

Home | Events | Friends | Tags | Metros | Users | Groups | Venues | Popular | MySettings | Help | Logout Upcoming.org Groups allow you to find and collect events by interest, location, or anything you imagine. You can discuss sets of events, like worldwide tours for bands, or even museum showings. To find a group for you, you can browse the tags (special user-entered keywords), or browse the entire group directory by clicking the link at the bottom.

Find a Group!

[          ]  [Search Groups]

Group Tags: music web libertarian indie activism community art design events politics technology rock chicago culture activist opensource bloggers social boston electronic

| My Groups | My Friends' Groups | Add a new group... |

You don't belong to any groups yet. Groups are a great way to find new events and meet new people, start or join one to make a Group badge. When you do, they'll show up here.

| Group | Members | Discussions |
|---|---|---|

Newest Groups

| Created On | Group | Members | Discussions |
|---|---|---|---|
| March 7 | Morrissey | 1 | 0 |
| March 7 | Brighton Mountain Bikers | 4 | 0 |
| March 7 | Rally | 1 | 0 |
| March 7 | South East Michigan Ruby Users Group | 1 | 0 |
| March 6 | Manchester Metropolitan University | 1 | 0 |

Upcoming Badges [NEW!]

Publish your events on your own website with a new Upcoming Badge!

What's New?

Aw, no activity since your last login. Try adding comments to events your friends are watching to get things started!

See all recent updates

Site News [XML]

January, 18 2006 06:56 PM
So, you might have noticed a few small changes around here over the past few days... The biggest are the recent activity, social network browsing, and the new token-based API authentication. [Read More...]
13 comments Browse tag "Seminar" in All Metros XML

| Date | Event Name | Metro | Comments | People |
|---|---|---|---|---|
| Mar 22+ | TechLeaders: Realizing Your Vision | San Francisco Bay... | 0 | 8 |
| Mar 25+ | NLP for Beginners | San Francisco | 0 | 1 |
| Apr 28+ | Real Estate Action Weekend | Vancouver | 0 | 1 |
| May 13 | Land Rush 2006 | Vancouver | 0 | 1 |
| Jun 26+ | Philosophy Seminar with Roderick Long | Auburn | 0 | 1 |
| Jul 24+ | Commerce and Culture: A Seminar with ... | Auburn | 0 | 1 |

FIG. 3E

Browse tag "music" in All Metros

| Date | Event Name | Metro | Comments | People |
|---|---|---|---|---|
| Mar 07 | 65daysofstatic ♪ | London | 4 | 4 |
| Mar 07 | Cordero ♪ | Philadelphia | 0 | 1 |
| Mar 07 | Deadstring Brothers Bloodshot CD Rele... ♪ | Arlington | 0 | 1 |
| Mar 07 | Low ♪ | Seattle | 0 | 14 |
| Mar 07 | The Delays ♪ | London | 0 | 1 |
| Mar 07 | Wolfmother ♪ | London | 10 | 3 |
| Mar 07 | Victor Tsaran ♪ | Palo Alto | 0 | 2 |
| Mar 07 | Scion xPress Fest | New York ♪ | New York City | 0 | 3 |
| Mar 07 | Scion xPress Fest | New York ♪ | Brooklyn | 0 | 1 |
| Mar 07 | Scion xPress Fest | New York ♪ | New York University | 0 | 1 |
| Mar 07 | Supercade and more @ TT Reynolds ♪ | Washington, D.C. | 0 | 2 |
| Mar 07 | theVenus Kicks, Empty Vessels, Forms... ♪ | London | 0 | 1 |
| Mar 07 | Scout Niblett, Talkdemonic, LKN ♪ | Portland | 1 | 6 |
| Mar 07 | Tristan Prettyman and Ben Taylor ♪ | Park City | 0 | 1 |
| Mar 08 | Flyleaf ♪ | London | 0 | 1 |
| Mar 08 | Creative Commons Salon ♪ | San Francisco | 2 | 44 |
| Mar 08 | Juliana Hatfield, Hilken Mancini & Ch... ♪ | London | 0 | 2 |

Upcoming Badges [NEW!]
Publish your events on your own website with a new Upcoming Badge!

What's New?
Aw, no activity since your last login. Try adding comments to events your friends are watching to get things started!

See all recent updates

Site News XML
January, 18 2006 06:56 PM
So, you might have noticed a few small changes around here over the past few days... The biggest are the recent activity, social network browsing, and the new token-based API authentication. [Read More...]
13 comments

CREATING AND VIEWING PRIVATE EVENTS IN AN EVENTS REPOSITORY

FIELD OF THE INVENTION

The present invention relates to accessing data and, more specifically, to a technique for creating and viewing private events in an events repository.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Event marketers and promoters typically desire to have event information reach a large number of people to increase the popularity and attendance of the event. Thus, traditional media such as print, radio and television are conventionally used to communicate event information to a large amount of the population. The larger the audience the event information reaches, the more likely the attendance of the event will increase.

Through the advent of the Internet and the World Wide Web ("Web"), communication of such events may be instant and widespread to an even larger portion of the population. Further, publishing event information over the Internet incurs minimal cost in relation to traditional media. For example, the event information need not be replicated on physical paper, and the cost of digital replication is minimal when compared to using traditional media. In order to communicate such event information to Internet users, marketers and promoters create web content which may be accessed through an event application associated with a web address. Internet users may view the event information by using a web browser to send a request to the web address. In response to the request, the event application sends to the browser a web page that includes event information.

Unfortunately, event information that one event application makes available to browser users is not easily accessed and used by third-party applications. For example, some developers may desire to create third-party applications to allow end-users to access a customized subset of the information that is made available to end-users by another event application (the "first-party" application). However, developing such third-party applications is difficult because event information is usually stored in a proprietary format, and is usually only directly accessible to the first-party application.

In order for third-party applications to gain access to event information contained in the event repository used by the first-party application, much time and effort is needed to design the third-party application to integrate with the proprietary formats of the event data. Further, the event repository itself is often not directly accessible by third parties.

Another drawback of existing presentations of event information is the lack of control end-users have over the event information itself. Although event marketers wish to provide event information to many end-users, event marketers may also wish to limit access to event information. Also, event viewers are not given control over the manner in which events are classified or organized.

Therefore, what is desired is an improved mechanism for creating, accessing and viewing event information.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1D is a diagram depicting the communication flow between components of a communication system for accessing an events repository according to one embodiment of the invention;

FIG. 2A is a diagram depicting a graphical user interface screen for creating an event record according to one embodiment of the invention;

FIG. 2C is a graphical user interface screen for selecting users authorized to view private events according to one embodiment of the invention;

FIG. 2D is a graphical user interface screen displaying user-selected events according to one embodiment of the invention;

FIG. 2E is a graphical user interface screen displaying public and private events according to one embodiment of the invention;

FIG. 2F is a graphical user interface screen for creating and/or selecting a group within an event application according to one embodiment of the present invention;

FIG. 3E is a graphical user interface screen for displaying events associated with a tag according to one embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An event-sharing system includes a first-party event application that provides access to an events repository. Event information within the events repository defines real world events. The first-party event application may be used by end users to share real world event information. Specifically, the first-party event application includes an event application interface that allows users can share and collaborate in a social events network environment.

Further, the event-sharing system provides an API through which third-party applications can access, view and modify event information contained in the same events repository that is used by the first-party event application. Such third-party applications may provide customized user interfaces for sharing events, and/or provide customized event information directed to particular audiences.

According to one embodiment, the events repository is a database. In other embodiments, the events repository may be any entity capable of storing records defining real world events. The events repository defines real world events by associating the events with identifying information. For example, each record within the events repository may be identified by an event ID, and event-author, an event venue and a time. The event-author information identifies the user that created the event record information. Also, the event venue identifies the physical location of the event while the event time identifies the calendar/clock time when the event will occur. Other information that may be associated with an event record includes a title and description of the event.

Event Applications

In order to access information within the events repository, operations are performed against the events repository by an event application. As mentioned above, the event application may be the first-party event application, or a third-party event application. The event application is controlled by end-users through a graphical user interface. The GUI may be accessed locally or via the Internet.

Figure 1A:
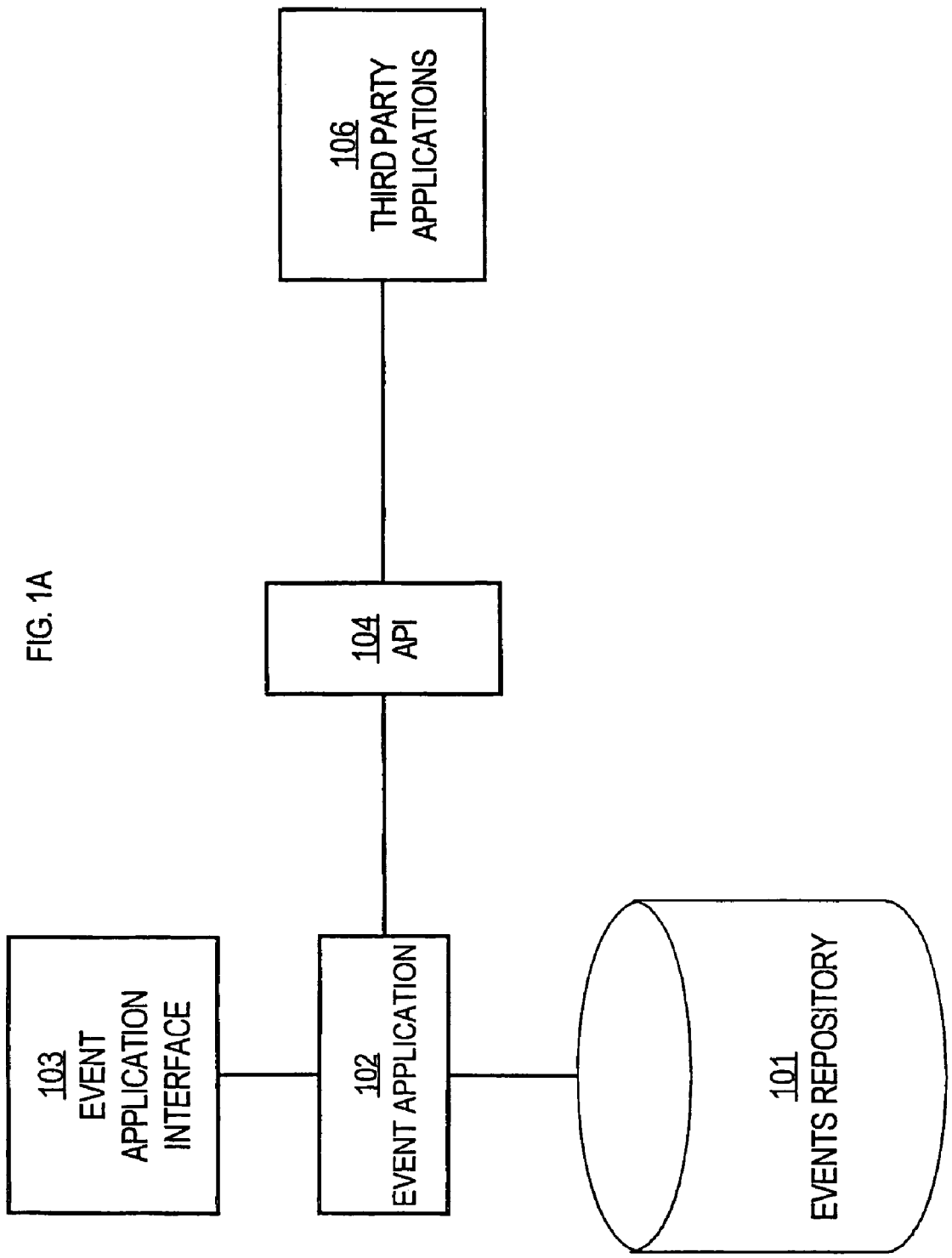
FIG. 1A is a diagram depicting a communication system for accessing an events repository according to one embodiment of the invention.
Figure 1B:
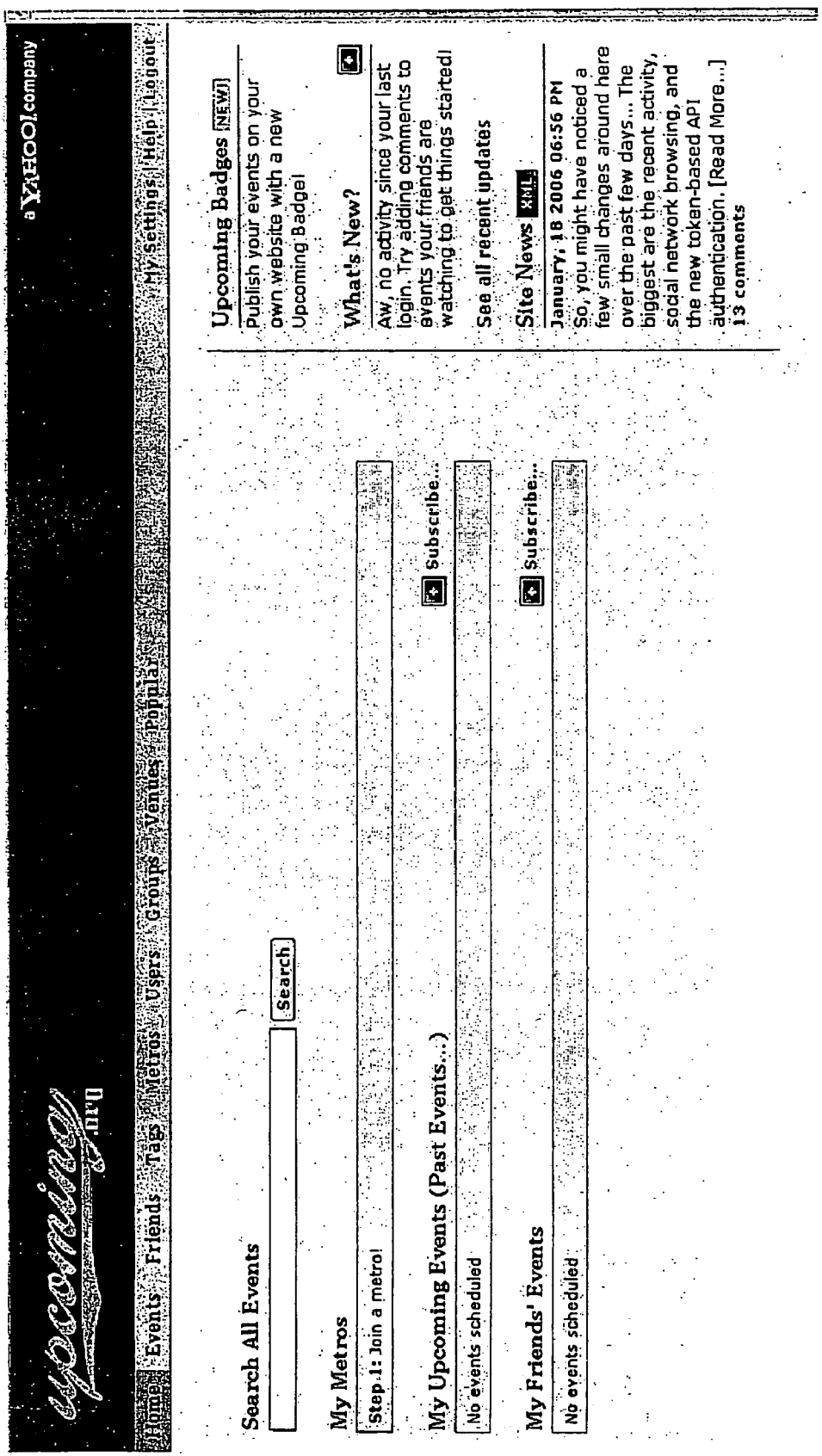
FIG. 1B is a diagram depicting a graphical user interface screen of an event application according to one embodiment of the invention.
Figure 1C:
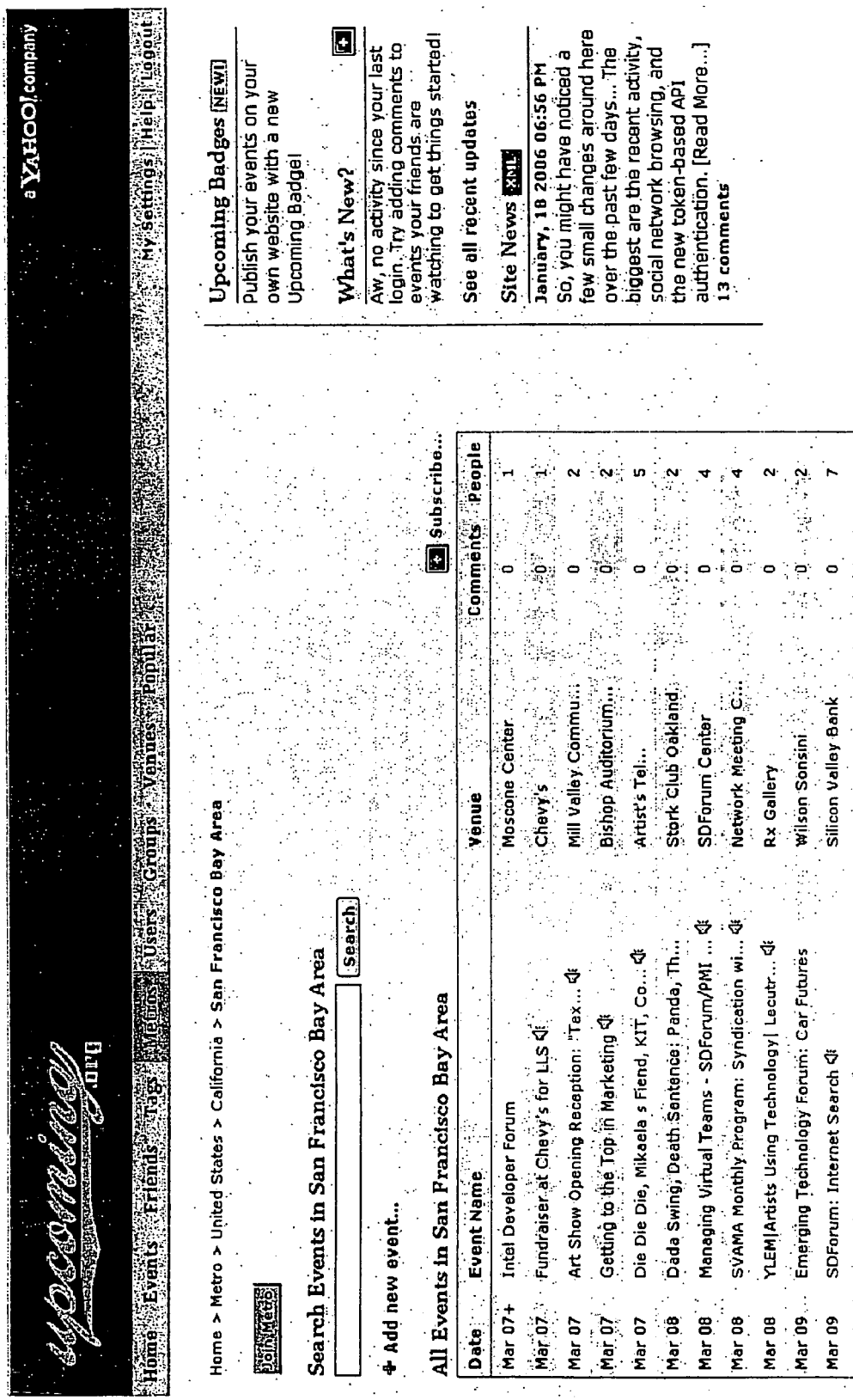
FIG. 1C is a diagram depicting a graphical user interface screen with event data according to one embodiment of the invention.

Referring now to FIG. 1A, a block diagram illustrating a communication system for accessing an events repository is shown in accordance with one embodiment. The system includes an Events Repository 101, which contains records identifying real world events. Real world events are events that take place at a geographic location at a specified calendar time. For instance, examples of real world events may be concert shows, birthday parties, dinner parties, and other similar events.

The Event Application 102 generally represents a first-party event application that is designed to perform operations on the Events Repository 101. Operations that the Event Application 102 may perform include querying data according to user-specified filters and inserting data into the Events Repository 101 in the form of event records.

Additionally, Event Application 102 is responsible for formatting data received from the Events Repository 101 for display to a user at the Event Application Interface 103. For example, the event data retrieved from Events Repository 101 may not be in a user-readable form. Instead, data within the Events Repository 101 may be in a native form used for communication between the Events Repository and other components, such as Event Application 102 and API 104. Thus, Event Application 102 is responsible for transforming the events data for display to a user. The Event Application 102 displays the events data to a user using the Event Application Interface 103.

The Event Application Interface 103 provides an interface for allowing users to access, view and modify information located within the Events Repository 101. The Event Application Interface 103 allows users to control the Event Application 102 through a graphical user interface (GUI) environment. According to one embodiment, the Event Application Interface 103 is provided as a web application that may be accessed via the Internet or World Wide Web (Web). In other embodiments, the Event Application Interface 103 may be located locally within the same system as Event Application 102 or Events Repository 101.

Application Programming Interface

In many circumstances, third-party developers desire to create Third-party Applications 106 for end-users. Third-party developers further desire to use information within the Events Repository 101 to display or use at the Third-party Applications 106. In order for Third-party Applications 106 to access and interact with the Events Repository 101, an Events Application Programming Interface (API) 104 is provided.

In the illustrated embodiment, the API 104 allows Third-party Applications 106 to make calls to routines implemented in and exposed by the first-party Event Application 102. In alternative embodiments, the routines exposed by the API 104 may be routines implemented external to the first-party Event Application 102 that are called by both the first-party Event Application 102 and the Third-party Applications 106.

The API 104 provides access to information in the events repository to third-party applications. In particular, the API provides access to a set of routines for performing actions on the events repository. Hence, Third-party Applications 106 may include instructions that call the set of routines to cause actions to be performed against the Events Repository 101.

SQL Embodiment

According to one embodiment, event applications my request actions by invoking Structured Query Language (SQL) methods for performing actions against data repositories, such as databases. SQL defines a number of actions for data retrieval, manipulation, definition and other transactions involving data. Thus, the Events Repository 101 may employ a server that supports the SQL language, for performing data transactions.

Event Application 102 and third-party Event Applications 106 can receive input from users requesting that particular actions be performed on the Events Repository 101, and in response, translate the user requests into SQL statements to perform against the Events Repository 101. Note that in other embodiments other languages may be used to communicate and perform operations on the Events Repository 101.

Representational State Transfer

According to one embodiment, the API 104 uses a Representational State Transfer (REST) architecture for communicating with the Events Repository 101, Event Application 102 and Third-party Applications 106. In a RESTful API, users submit a HyperText Transfer Protocol (HTTP) request to a specified Uniform Resource Locater (URL). A service associated with the specified URL receives the request and generates a response. The response contains the requested data in some format, such as Extensible Markup Language (XML).

For example, using the Web, a user may submit an HTTP request through a browser to a specified URL. In response, the user receives an XML document containing the requested data. XML is an advantageous form of data because it is a platform-independent way of defining data and data organization/structures.

According to one embodiment, third-party applications may specify event-related operations using REST. Specifically, a third-party event application may submit an HTTP request to API 104. In response, the routines that implement API 104 may access events repository 101 and provide event information back to the third-party event applications in the form of XML. The third-party event application is then free to do with the XML data whatever the third-party application developer wishes. For example, the third-party event application may transform the XML data for display or storage. Hence, developers of Third-party Applications 106 are able to access data from the Events Repository and utilize the data in XML form within their applications. The Third-party Applications 106 may have a custom interface for interacting with users, and developers may wish to integrate the events data into such interfaces for end-users.

By utilizing the REST architecture, use of the API 104 is advantageous because a client, such as a Third-party Application 106, may submit all data as part of one HTTP request. According to one embodiment the API 104 provides a set of methods to allow for the manipulation and extraction of event records from the Events Repository 101 using HTTP GET and POST requests. HTTP GET requests are requests for retrieving data from a data repository while HTTP POST requests cause for the insertion of data into a data repository.

Authenticating Third-Party Applications

According to one embodiment, before a Third-party Application may access the API 104, the Third-party Application 106 must obtain an authentication token. Referring now to FIG. 1D, a diagram illustrating the communication flow using the API is shown in accordance with one embodiment. FIG. 1D shows one embodiment of requiring the authentication of the Third-party Application 106. At step 112, the developer of the Third-party Application 106 submits a token request to the Event Application 102. The token request may be initiated using a graphical user interface as shown in FIG. 1E.

Figure 1E:
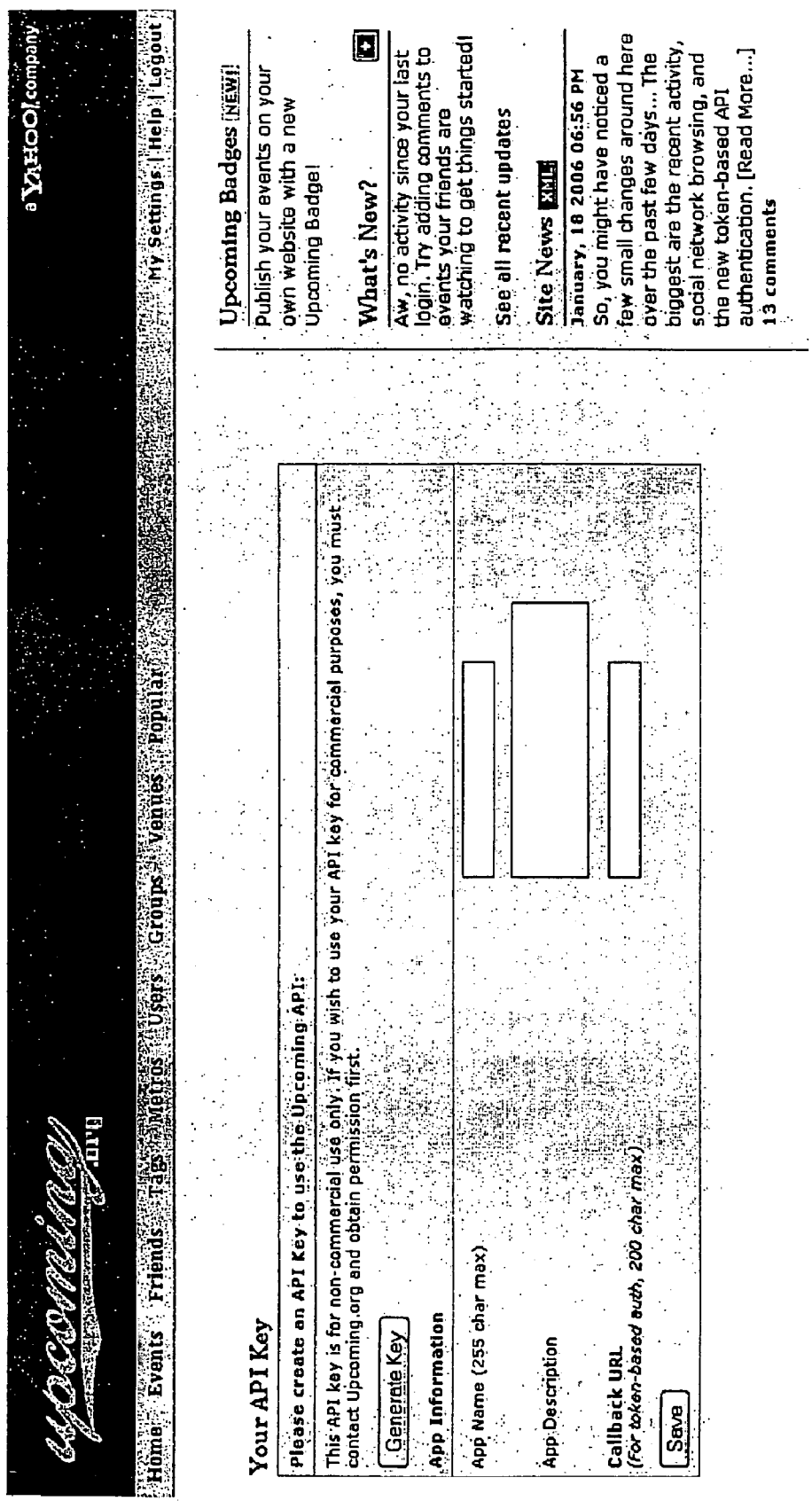
FIG. 1E is a diagram depicting a graphical user interface screen for requesting an authentication token according to one embodiment of the invention

Referring now to FIG. 1E, a developer of the Third-party Application 106 may use the GUI screen to request generation of an authentication token or "key". Further, using the GUI screen, a Third-party Application 106 developer may enter information regarding the application, such as an application description and a callback URL. The callback URL may be, for example, a URL associated with Third-party Application 106, at which the Third-party Application 106 receives all event data that is requested by the third-party Application 106 through API 104. The callback URL thus defines the channel on which data should be communicated from the Events Repository 101 back to the Third-party Application 106.

In response to the developer has submitting the request, at step 113, the Event Application 102 generates an authentication token and displays the authentication token information on the GUI screen. In other embodiments, the Event Application 102 may provide other mechanisms of communicating the authentication token to the developer of the Third-party Application 106. For example, the authentication token may be sent in an email message to an email address specified by the third-party application developer.

Once the authentication token is obtained by the third-party application developer, the third-party application developer designs the Third-party Application 106 to include the authentication token when the third-party application 106 submits requests to the Event Application 102 in order to perform operations on the Events Repository 101.

Referring back to FIG. 1D, at 114, the Third-party Application 106 places an HTTP routine call to the Event Application 102. According to one embodiment, the HTTP routine call identifies the authentication token to the Event Application 102. In order to determine if the Third-party Application 106 is authorized to access the Events Repository 101, the Event Application 102 determines whether the HTTP routine call includes a recognized authentication token. If so, the Event Application 102 processes the HTTP Routine Call by issuing a Native Routine Call to the Events Repository 101.

Otherwise, if the request made by the third-party application does not include a recognized authentication token, then the Event Application 102 can reject the HTTP Routine Call and request that the Third-party Application 106 obtain an authentication token, for example, by responding with an error message. Alternatively, the Event Application 102 may return a different set of event information than would have been returned if the third-party application did include a recognized authentication token.

Example API Call by a Third-Party Application

According to one embodiment, the HTTP Routine Call includes parameters required to form a Native Routine Call to Events Repository 101. Hence, only one HTTP Routine Call is required to perform an operation on Events Repository 101. Such is an advantage of utilizing a RESTful API. One example of a sample query with an API authentication token is as follows:

http://www.upcoming.org/services/rest/?api_key=<APIKEY>&method=event.search&search_text=killers&metro_id=1

In this example, the Event Application API is accessed at http://www.upcoming.org/services/rest using the authentication token APIKEY. The HTTP Request indicates to use the event.search operation, which defines a search operation to be performed against the Events Repository 101. Further the HTTP Request also includes the search text and other filters for use in the search.

When the Event Application 102 receives and authenticates the request using the authentication token, at step 115, the Event Application 102 interprets the HTTP Routine Call and constructs a Native Routine Call to the Events Repository 101. The Native Routine Call 115 may be in a language or protocol different from the HTTP Routine Call. For example, according to one embodiment, the Native Routine Call may be an SQL statement performed against the Events Repository 101. The Events Repository 101 receives the Native Routine Call, which causes the Events Repository to perform any number of actions, such as retrieve events data or insert events data into tables of the Events Repository 101.

The Events Repository 101 performs the requested action, and in response supplies the results of the request in the form of Native Data at step 116. Thus, Event Application 102 is responsible for translating the HTTP Routine Call into the native format of the Events Repository.

At step 117, the Event Application 102 translates the Native Data into a standard format, such as XML data, and provides the XML data to the Third-party Application 106. The third-party Application 106 receives the data and, in one embodiment, causes event information represented by the data to be displayed to an end-user using a Third-party Application interface. In other embodiments, the Third-party Application 106 may use the data for any other purpose.

Example Routines Exposed by API 104

According to one embodiment, the Third-party Application may use the event.search method as provided by the API to search for event information within the Events Repository 101. Note, however, that other methods available within the Events API for use by Third-party Applications are listed in Table 1. The methods in Table 1 are either HTTP GET methods or HTTP POST methods.

TABLE 1

| Method | Description |
| --- | --- |
| auth.getToken [HTTP GET] | Retrieve a token from the site |
| auth.checkToken [HTTP GET] | Retrieve a full token from Upcoming.org, from just the token code. This method should also be called on saved tokens before proceeding to access user data, in order to verify that the token has not expired and is valid. |
| event.getInfo [HTTP GET] | Retrieve event information and metadata for public and private events. |
| event.add [HTTP POST] | Add a new event to the database. This method requires user authentication. |
| event.search [HTTP GET] | Search Upcoming.org for public events by multiple facets. If optional user authentication is provided, searches private events. |
| event.getWatchlist [HTTP GET] | Get a watchlist for an event. You must pass user authentication parameters for this function. You will only be shown your own private events plus those of people who have marked you as a friend. Returns user nodes for each user on the watchlist. Returns either status = "attend" or status = "watch" |
| metro.getInfo [HTTP GET] | Retrieve the details about a geographic metro. |
| metro.search [HTTP GET] | Searches for geographic metros whose name or "code" matches the search_text. |
| metro.getMyList [HTTP GET] | Retrieve a list of metros for a particular state. |
| metro.getList [HTTP GET] | Retrieve a list of metros for a particular state. |
| metro.getStateList [HTTP GET] | Retrieve a list of states for a particular country. |
| metro.getCountryList [HTTP GET] | Retrieve a list of all countries in the database. |
| venue.add [HTTP POST] | Add a new venue to the database. You must pass user authentication parameters for this function. |
| venue.getInfo [HTTP GET] | Retrieve the details about a venue. |
| venue.getList [HTTP GET] | Retrieve a list of venues for a particular metro. |
| venue.search [HTTP GET] | Allows searching through venues. |
| category.getList [HTTP GET] | Retrieve a list of valid event categories. |
| watchlist.getList [HTTP GET] | Retrieve the watchlist for a user. |
| watchlist.add [HTTP POST] | Add an event to a user's watchlist. This function will delete an existing watchlist setting and replace it with the new one, so you don't have to call watchlist.remove first. |
| watchlist.remove [HTTP POST] | Remove a watchlist record from a user's watchlist. |
| user.getInfo [HTTP GET] | Retrieve the details about a user. |
| user.getInfoByUsername [HTTP GET] | Retrieve the details about a user. |
| user.getMetroList [HTTP GET] | Retrieve a list of geographic metros for a particular user. |
| user.getWatchlist [HTTP GET] | Get all events in the watchlist for a user. You must pass user authentication parameters for this function. The 'username' returned is the username of the watchlist owner. It also returns either status = "attend" or status = "watch". Watchlists for personal events that are created by friends of the user authenticated are shown. |

Using the above methods or routine calls, Third-party Applications 106 may access and perform actions against the Events Repository 101 using simple HTTP GET and POST operations. Further, note that the list of routines in Table 1 is not comprehensive, and additional routines may be used within the API 104.

Each method or routine may be used to pass parameters specifying conditions of a requested operation. According to one embodiment, the API defines acceptable parameters for each routine. For example, according to the API, the event.getInfo routine may use the following parameters: api_key, event_id, and token. The api_key parameter defines the API application key and the event_id identifes the EVENT ID number of the particular event. Both the api_key and event_id parameters are required for use of the event.getInfo method. Further, one optional parameter is the token parameter, which defines an authentication token for viewing events marked as private. Note that in other embodiments, additional parameters may be specified.

In response to making these routine calls, the Third-party Applications 106 receive data from the Event Application 102. In the case that an error has occurred during the call to the routine or method, the Event Application 102 may return an error code indicating that an error has occurred. Otherwise, the Event Application 102 returns data as requested through the routine call.

According to one embodiment, the data may be in the form of XML. One example of a response in the form of XML data may be the following:

```
<?xml version="1.0" encoding="UTF-8"?>
<rsp stat="ok" version="1.0">
    <event id="1" name="Tori Amos, Ben Folds"
        tags="music,concert"
        description="The "Lottapianos" Tour. Ben Folds is
        opening,
```
and will
```
        play a one hour set."
        start_date="2003-08-01"
        end_date="0000-00-00"
        start_time="19:00:00" end_time=" "
```

-continued

```
        personal="0" selfpromotion="0"
        metro_id="1" venue_id="1"
        user_id="1" category_id="1"
        date_posted="2003-06-07"
            latitude="37.765"
            longitude="-122.396"
            geocoding_precision="address"
            geocoding_ambiguous="0"/>
</rsp>
```

The XML data as shown above is received in response to an event.getInfo method call using an event_id parameter of "1". The XML data identifies the event name, description, event date, time, and other information useful for Third Party Applications 106. Such XML data received by the Third Party Applications 106 adheres to a standard format or structure, making it easy for Third Party Applications 106 to parse and use the XML data. Note, however, that in other embodiments, the Event Application 102 may send data to Third Party Applications 106 in any acceptable format.

User Authentication Pass-Through

The first-party Application 102 may implement a user-specific authentication mechanism. A user-specific authentication mechanism may be used, for example, to implement private events that are described in greater detail hereafter. With a user-specific authentication mechanism, the identity of a user may dictate what events the user is allowed to see. If third-party applications 106 have unrestricted access to all events data, then the user-specific authentication of first-party Application 102 may be compromised by third-party applications. To avoid compromising the user-specific authentication mechanism of first-party Application 102, API 104 may be implemented in a manner that only provides third party applications with event information that is viewable by all users.

However, Third-party Application 106 designers may want their users to be able to see their user-specific event information. Thus, according to one embodiment, the Third-party Application 106 may be programmed to request identification information from end-users. When the end-user submits a request through the Third-party Application 106 to the Events Repository 101, the Third-party Application 106 submits the user identification information along with the HTTP Routine Call. In response requests that include user identification information, the API 104 sends to the third-party application 106 all of the event information that the specified user is allowed to see.

Third-party Application developers may decide to develop their own interfaces to interact with end-users. The Third-party Application developers may design application interfaces suited for many different purposes. However, regardless of third-party application design, through use of the API 104, Third-party Applications 106 have versatile access to the Events Repository 110, and may interact with the Events Repository 110 to perform many functions traditionally performed by the Event Application 102.

Exposing Private Events in an Events Application

Event data within the Events repository is conventionally available for all users of the Event Application 102, including Third-party Applications 106. In some instances, however, event-authors (users who wish to create or publish events) may wish to create "private events" that are only viewable by a selected number of event application users.

According to one embodiment, an event repository system is provided that includes a mechanism that allows event-authors to designate the events and venues that they create as "private". Events and venues that are marked as "private" are only accessible by (1) the event-author and (2) users that the event-author has marked as authorized to view the event.

According to one embodiment, each user of the Event Application identifies a group of other users as "friends". Any user identified as a "friend" of the event-author may be authorized to view the event-author's private events. When a user stores an event record within the events repository using the Event Application or Third-party Application, information identifying the user as the event-author of the event record is associated with the event record.

Further, the Event Application 102 or Third-party Application 106 allows event-authors to designate events as public or private events. In the case an event is designated as a public event, any user with access to the Events Repository 101 may view the event. However, if the event-author has designated an event as a private event, only users who have been designated by the event-author as authorized to view private events of the event-author may access the private event.

According to one embodiment, each event-author designates a single list of user designated "friends." Each user on this list is authorized to view the event-author's private events. In other embodiments, however, the event-author may establish more than a single list or grouping of users. Further, for any particular event, the event-author may individually select users who are authorized to view that particular event.

In an alternative embodiment, an event-author's "friends" may vary from event to event. For example, a user may specify separate lists of "work friends", "camping friends" and "close friends". When the user creates a private event, the user may specify on an event-by-event basis which set(s) of friends are allowed to view that specific event.

GUI for Creating Private Events

Figure 2A:
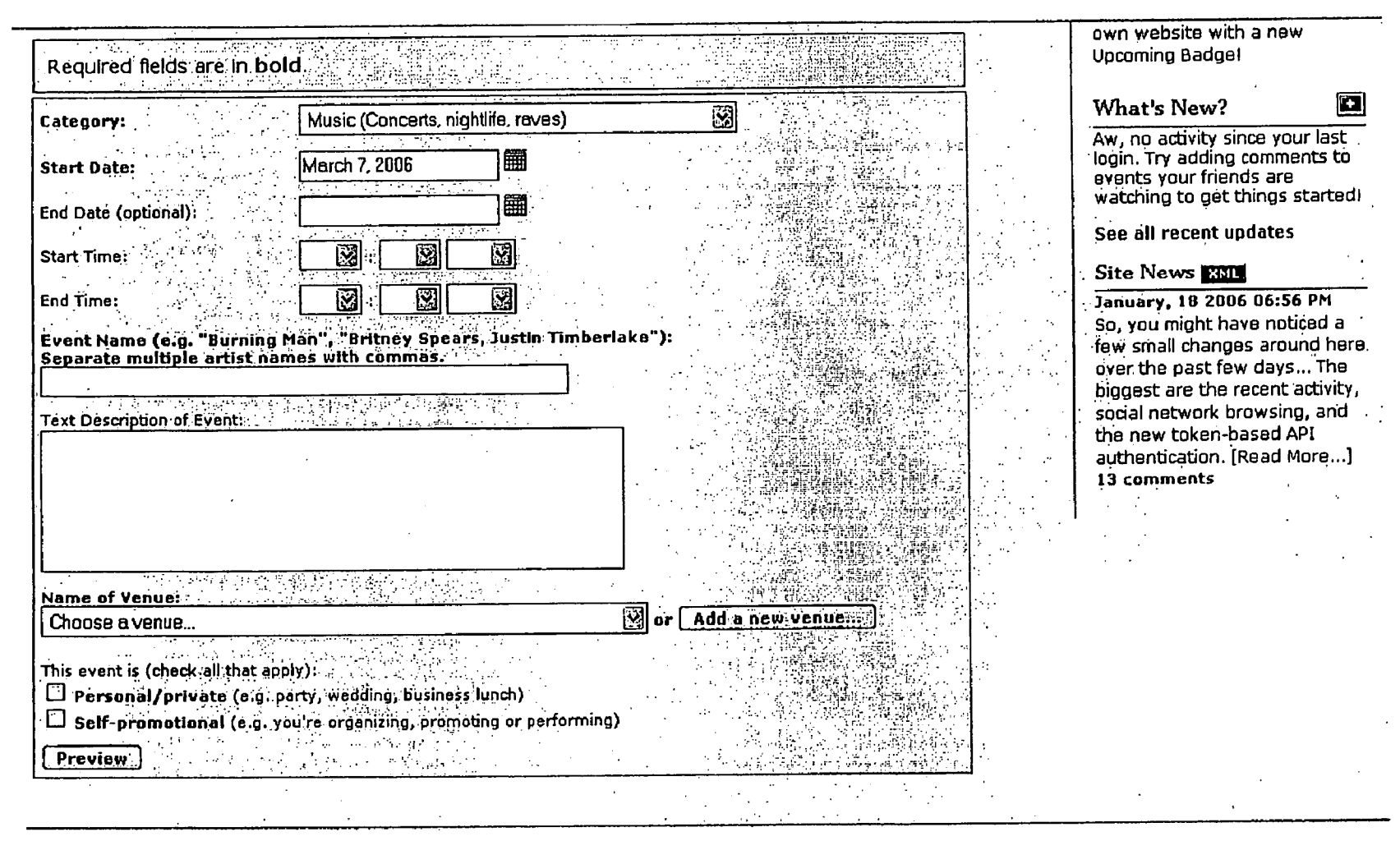

Referring now to FIG. 2A, a GUI screen for creating private events is shown in accordance with one embodiment. The GUI screen shown in FIG. 2A represents a screen of the Event Application Interface 103. When an Event Application 102 user would like to create a private event, the user may navigate to the GUI screen using a web browser. The GUI screen presents input fields requesting data from the user. For example, the data input fields request the user specify the category, start data, time, event name, description and venue of the event. Further, one option for the user is whether to designate the event as personal or private. In the event that the user designates the event as a public event, all users with access to the Events Repository 101 will be able to view the event information. However, if the user has designated the event as a private event, other viewing rules will take effect as further described herein.

Events Repository that Supports Private Events

Figure 2B:
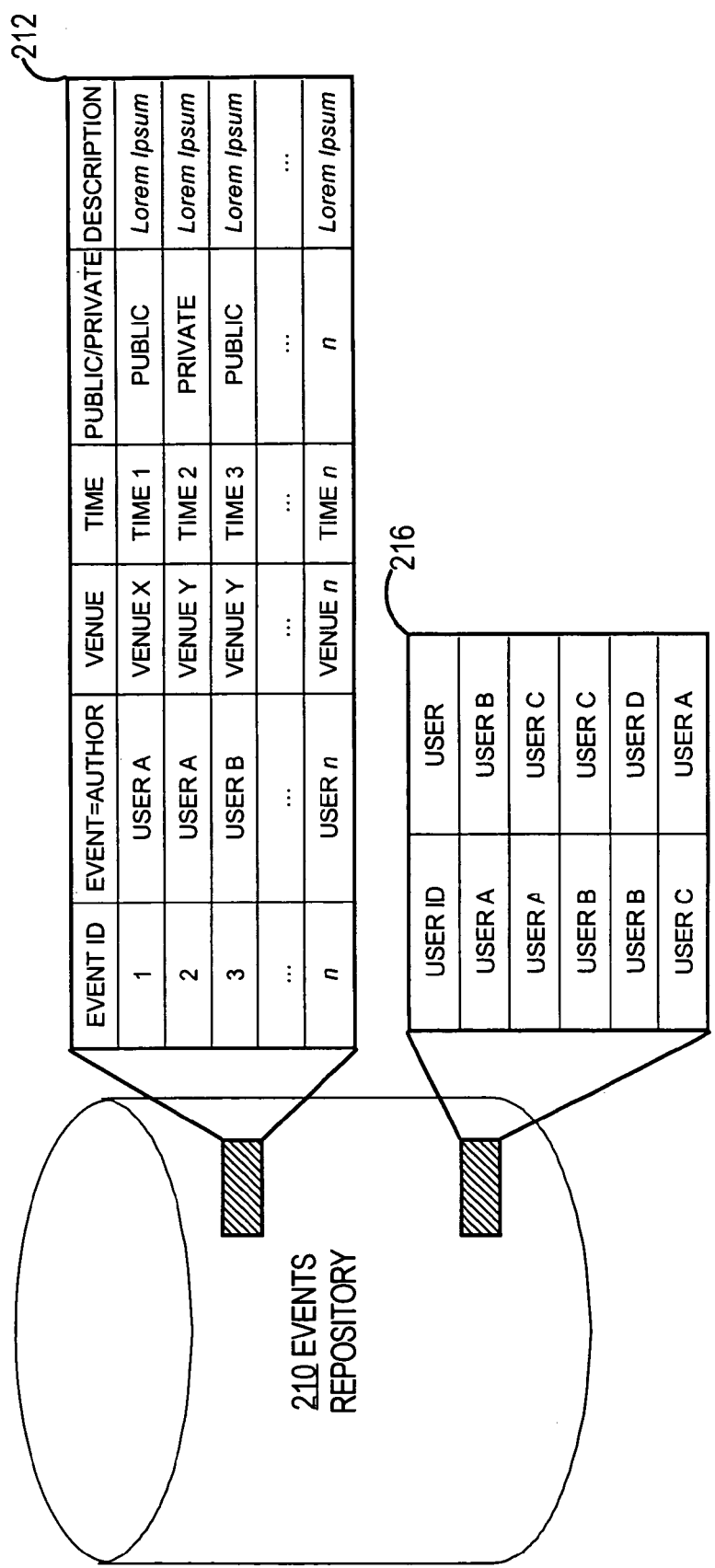
FIG. 2B is a block diagram illustrating the contents of an events repository according to one embodiment of the invention.

When an event is created, an event record is placed into the Events Repository 101. The Events Repository 101 associates event records with user-information, such as whether the event record is a public or private event record. Referring now to FIG. 2B, a block diagram illustrating the contents of an events repository is shown in accordance with one embodiment. The Events Repository 210 contains table 212.

According to one embodiment, table 212 defines event records within the Events Repository 210. Each event record contains an Event ID, an Event-Author, a Venue, Time, Public/Private designation and a Description. In other embodiments, event records within table 212 may contain any other number of fields.

Table 212 defines public/private designations to event records. For example, using table 212, an Event Application 102 may determine whether any event is public or private. Note that in other embodiments, the Public/Private designation information may be located in a separate table.

Additionally, table 216 defines user relationships within the Event Application 102. The data in table 216 identifies whether a user has designated another user of the event application as authorized to view private events. If two users have designated each other as authorized to view private events, the relationship is a "bilateral" relationship.

In order to specify who is authorized to view private events of an event-author, event-authors of the Event Application 102 are provided a means for designating other users of the Event Application 102 as authorized to view the event-author's private events. According to one embodiment, such users are labeled "friends" of the event author. For example, each user of the Event Application 102 may designate a number of other users of the Event Application 102 as being in a "friends" list. Users within an event-author's "friends" list are automatically authorized to view the event-author's private events.

Displaying Private Events

When a user wishes to view a private event authored by another user, or when the Event Application is determining which events to display to a user, the Event Application must first determine whether the user is authorized to view the event-author's private events.

According to one embodiment, the authorization from an event-author works in a unidirectional manner. For example, only users that the event-author has specifically marked as authorized may view the private event. Thus, a user who has marked an event-author as a friend may nonetheless be prohibited form viewing the event-author's private events due to the unidirectional nature of the authorization.

For example, referring now to table 216, although User A has marked User B as authorized to view private events, the relationship is not bilateral, meaning that User B has not marked User A as authorized to view User B's private events. Hence, User B may view User A's private events, but User A may not view User B's private events. In order to determine whether User B is authorized to view User A's private events, the Event Application 102 may query the Events Database and perform a lookup of table 216. By examining information from table 216, Event Application 102 can determine that User B is authorized to view User A's private events and display the events to User B. However, User A and User C have a bilateral relationship. Specifically, because both User A and User C have designated each other as authorized to view private events, User A may view User C's private events and vice versa.

GUI for Selecting Authorized Viewers of Private Events

In order to select users as authorized to view private events, or to generally identify users of the Event Application 102 as friends, event-authors may search for users using a GUI screen of the Event Application 102. Referring now to FIG. 2C, a GUI screen for selecting authorized users is shown according to one embodiment. The GUI screen of FIG. 2C displays information regarding a single user of the Event Application 102. The GUI screen may display user information such as the user's name, geographic locations, and public or private events.

Further, in another embodiment, the user information screen also displays events that the user's friends have created that the user is authorized to view. Thus, as shown in FIG. 2D, events from users that this user has selected as friends are displayed. In this manner, a second degree of connectivity is made within the Event Application 102.

Referring now to FIG. 2E, a GUI screen displaying public and private events is shown according to one embodiment. Assume, for example, that User A has created a private event. When User B accesses the Event Application Interface, User B is presented with a GUI screen displaying events for the user. One option presented to User B is to view "My Friends' Events." Accordingly, if User B selects the "My Friends' Event" tab, the Event Application 102 performs an operation against the Events Repository 210 to determine which event records to display to User B. When determining which event records to display under the "My Friends' Events," the Event Application 102 may examine table 216 and determine relationships between User B and other users of the Event Application 102. According to one embodiment, table 216 shows that User A has designated User B as authorized to view User A's private events. Thus, the Event Application will retrieve event records designated as private by User A for display to User B. The private event records may display under the "My Friends' Events" section of the GUI Screen.

User-Group Events

In alternative embodiments, the Event Application 102 may also define groups of users or user-groups. User-groups define a set of users within the Event Application 102 with a common interest or attribute. For example, one user-group may be directed towards users in one geographic location while another user-group may be directed towards users with a particular taste in music. In other embodiments, user-groups may be formed based on any criteria, and all that is needed is one or more users to begin the user-group.

Within a user-group, users may share and post events and engage in discussion regarding events. If the user-group was directed towards a specific geographic location, users may view and submit events surrounding that geographic location to the user group.

Further, user-groups may also be designated public or private. According to one embodiment, events posted within a public group are viewable by all users of the Event Application. However, events posted within a private group are only viewable by members of the private group. In the instance that a user would like to post a private event to a public group, the private event will "inherit" the public nature of the public group. Otherwise, if a private event is posted within a private group, the event will remain private and also remain viewable to all members of the group, whether or not the event-author has specifically authorized each user of the private group as authorized to view private events.

Referring now to FIG. 2F, a GUI screen displaying available groups within the Event Application is shown according to one embodiment. The GUI screen displaying the user-groups allows users to view groups that they have subscribed to, and groups that their designated friends have subscribed. Further, a user of the Event Application may use the GUI screen to add a new user-group for the Event Application 102.

Figure 2G:
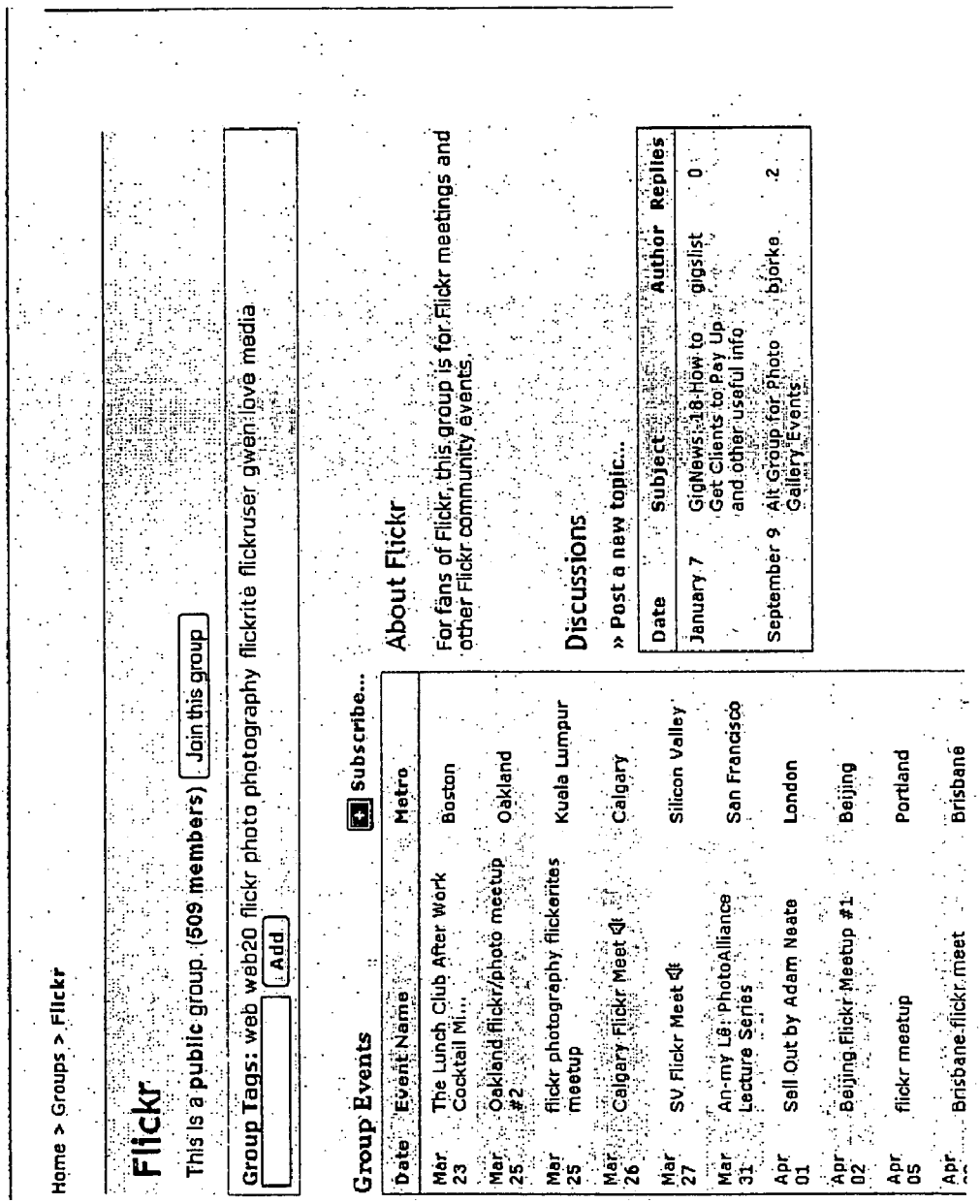
FIG. 2G is a graphical user interface screen displaying group information according to one embodiment of the invention.

When creating a new user-group, a group creator is given the option of designating the group as public or private. As described above, public groups are accessible to all users of the Event Application 102, and any event submitted to the public user-group becomes available to all users of the Event Application 102. If the user-group is marked private, however, One such group is displayed in FIG. 2G. The GUI screen of FIG. 2G displays a particular groups information. In this instance, the displayed group is a public group, and a user may join the public group from the GUI screen. Further, the GUI screen of FIG. 2G displays events that have been listed within the user-group by other users who are members of the user-group. The listing of events may also include public or private events, and private events that have been placed into user-groups are viewable by all members of the user-group.

In another embodiment, an event-author may allow access to private event information outside of the Event Application. For example, in some situations, event-authors may wish to invite people to events who are not users of the Event Repository. In this situation, the event-author can define a custom address where third parties may access private event information. According to one embodiment, the event-author may establish a custom URL address for accessing the event from outside the Event Application 102. In order to ensure secure access to the event listing, a short hash or authentication code may be appended to the URL in order to ensure secure access to the private event information.

Tagging Events

According to one embodiment, Event Application 102 includes mechanisms to facilitate user-designated tagging of events. Tagging is a process by which keywords, phrases, and other attributes are associated with records within a data repository. According to one embodiment, the Event Application 102 allows users to tag event records within the Event Repository 101. A Tag may be a keyword, image, sound, or any other attribute that may be associated with data. Hence, in one way, tags essentially describe an attribute of an event record that may not be inherent through information in the event record itself, in essence becoming an ad-hoc classification scheme for event information.

According to one embodiment, any event record that may be viewed by a user of the Event Application 102 may be tagged by that user, including event records for events authored by other users. Thus, the Event Application 102 may allow users to freely associate attributes or keywords with event records.

The Tags allow for an ad-hoc organization and classification of events. The keywords may be phrases relevant to the event content. For example, the attribute may not otherwise be identified through the event information such as the author, venue, geographic location or title of the event. As an example, consider that most "concerts" will not have the word "concert" within the description of the event. Thus, a user may assign the word "concert" to an event in order to further identify the event.

User-specified tags may be used in a variety of ways to facilitate the retrieval of information from event repository. For example, users may take advantage of the tags by including tag-matching criteria in their queries. For example, a user may search for all events that have been tagged with the word "concert".

GUI for Adding and Viewing Tags

Figure 3A:
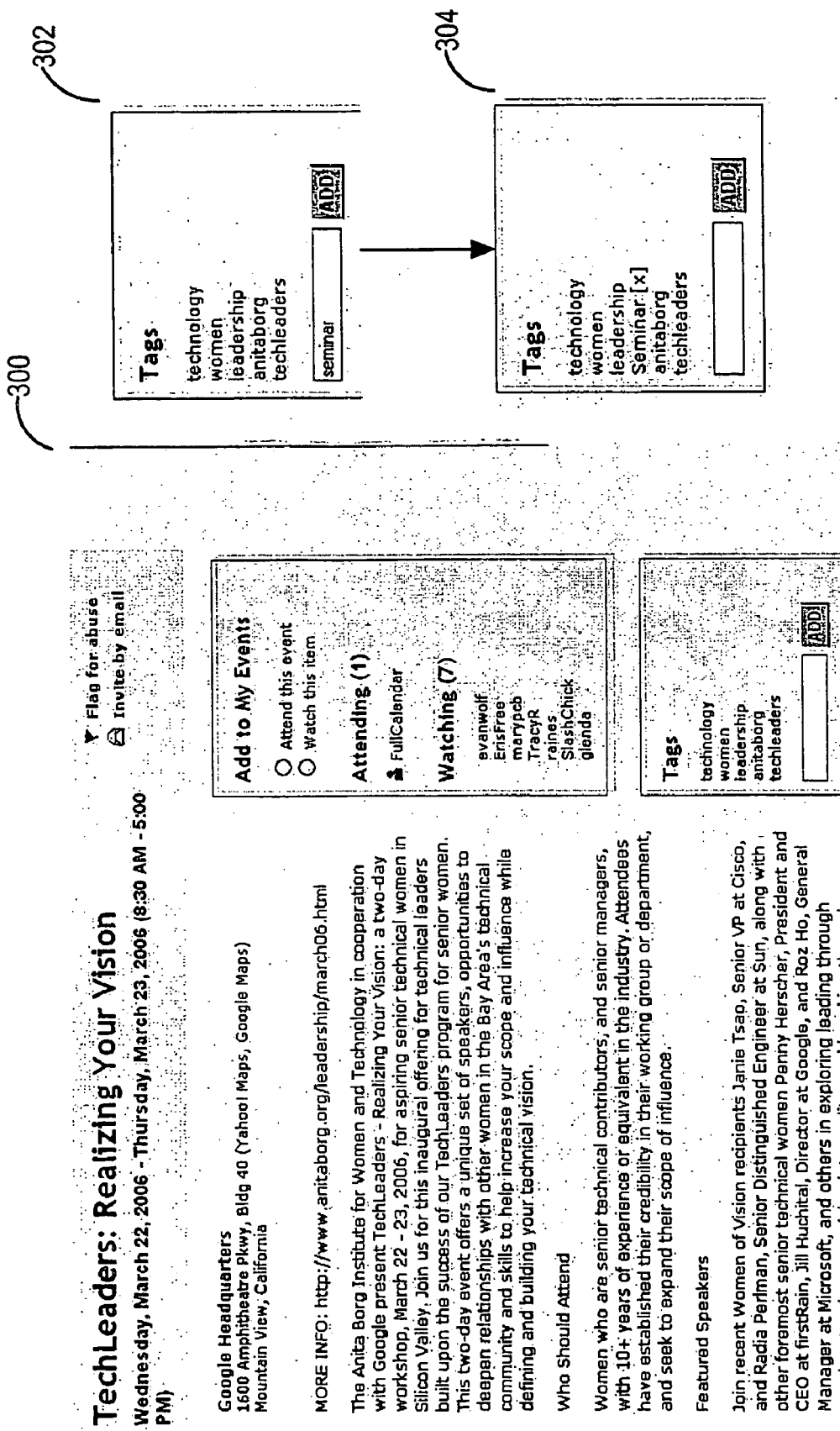
FIG. 3A is a graphical user interface screen for displaying event information according to one embodiment of the invention.

Referring now to FIG. 3A, a GUI screen displaying event information is shown. The event information screen contains an area containing a description of the event 300, including the venue, location and time the event will be taking place. Further, according to one embodiment, the GUI screen also contains an area labeled "Tags." The Tags area of the GUI screen displays tags that have been associated with the event. For example, for this particular event, the tags "technology", "women", "leadership", "anitaborg" and "techleaders" have been associated with the event.

The tags reflect attributes of the events and are represented within the event records in the Events Repository. The Tags area also allows a user to associate an additional tag with the event. For example, referring to 302, a user may wish to associate the word "seminar" with the event. When the user adds the Tag, the Tag shows up, at 304, in the Tags display area. Note that when a user adds a tag to an event, that user also has the option of removing the tag from the event.

According to one embodiment only users who have added tags to an event may remove tags from that event. In other embodiments, event-authors may control the removal of tags from events that they have authored, whether or not they created the tags that they want to remove. Thus, a first user may designate a tag for a particular event. When the user designates the tag, the Event Application stores the user-designated tag in association with the particular event within the Events Repository. Hence, the association of tags to events is stored within the Events Repository in the form of tag data records.

Events Repository Support for Tags

Figure 3B:
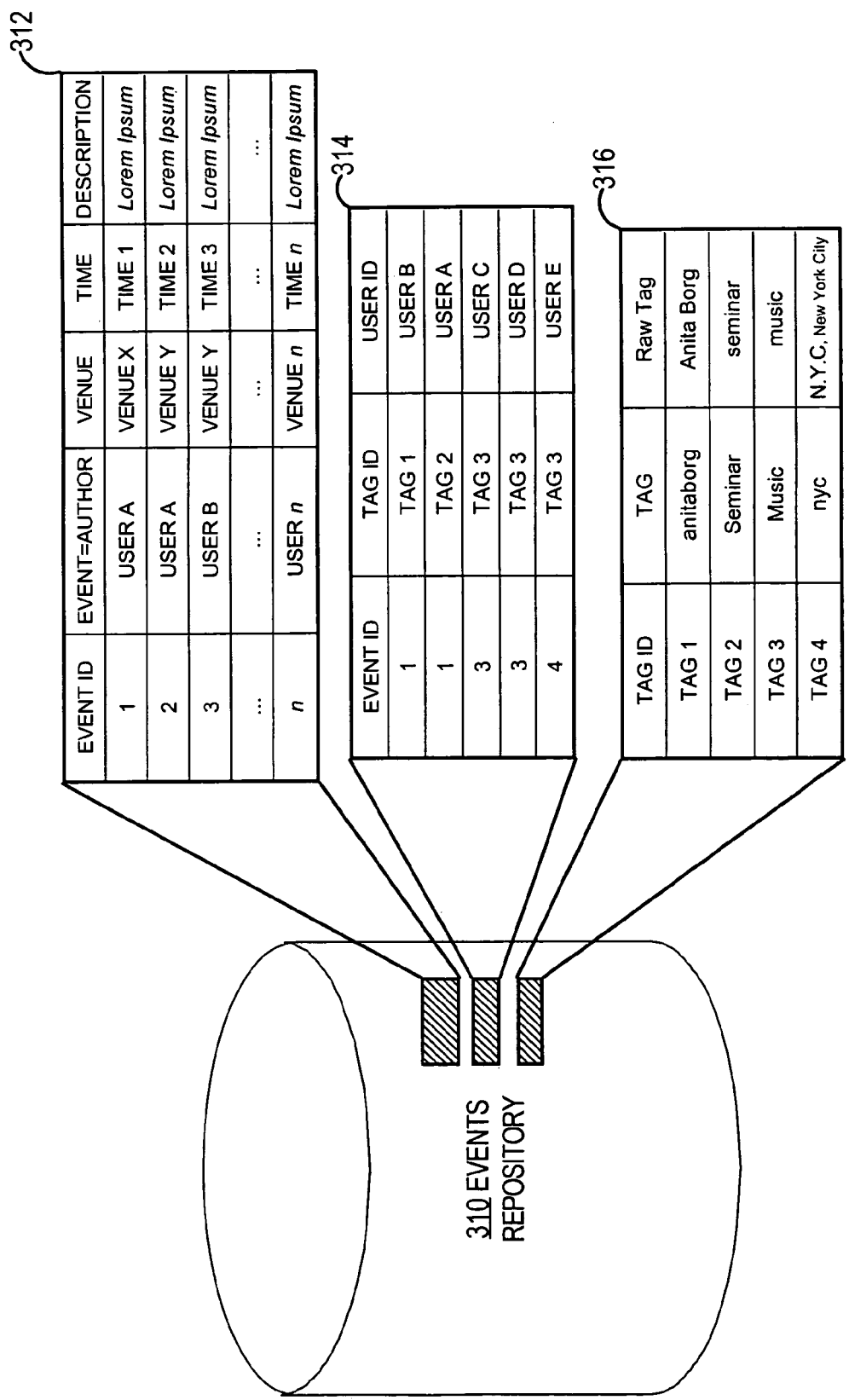
FIG. 3B is a block diagram illustrating the contents of an events repository according to one embodiment of the invention.

Referring now to FIG. 3B, a block diagram illustrating the contents of an events repository is shown in accordance with one embodiment. The Events Repository 310 contains tables 312, 314 and 316. According to one embodiment, table 312 defines event records within the Events Repository 210. As in FIG. 2B, each event record in table 312 contains an Event ID, Event-Author, Venue, Date and Description information. The Event ID column contains identifiers for the events, for example, a single event throughout the Events Repository 310 maintains a single Event ID, and only one event is associated with a single Event ID. In order to associate tags with events, the tags may be associated with the Event IDs. The use of Event IDs allow for the simple association of data within the Events Repository 310.

Table 314 contains an association of Event IDs to Tag IDs, which are associated with Tags within Table 316. According to one embodiment, Table 314 is organized by Event ID, such that each record contains an association of an Event ID to a single TAG ID. For example, Event ID 1, corresponding to the event shown on the GUI screen of FIG. 3A, is listed in multiple records within table 314. One record identifies the relationship between Event ID 1 and Tag ID 1 while another identifies the relationship between Event ID 1 and Tag ID 2.

In order to determine which tags are respectively associated with Tag ID 1 and Tag ID 2, the Event Application 102 can inspect table 316, which identifies relationships between Tag IDs and Tags. According to table 316, Tag ID 1 is associated with the tag "anitaborg," while the Tag ID 2 is associated with the tag "Seminar." Comprehensively, by inspecting tables 314 and 316, Event Application 102 can determine that Event ID 1 is associated with the tags "anitaborg" and "Seminar".

In another embodiment, Tag data within the Events Repository 310 may be organized differently, such as in Table 316. In Table 316, a new record is made for each new tag that is used within the Events Repository 310. For each tag listed in Table 316, a listing of Event IDs that are associated with the tag are shown in the Event IDs column. Hence, note that the tag "Seminar" is associated with Event IDs 1 and 2. Using Table 316, if a tag that was previously used for another event record is associated with a new event, the Events Repository 310 merely updates the Event IDs column to identify the relationship between the tag and the Event ID representing the event record. However, if a new tag is used, the Events Repository 310 can create a record within table 316 identifying the new tag as well as the Event ID associated with the new tag.

Example

Viewing Events Associated with a Tag

Assume a user would like to view events that have been associated with the tag "Seminar". The user can search for all "Seminar" events using the Event Application 102 or Third-party Application 106. According to one embodiment, a user may search for all events using an HTTP URL call such as http.//www.upcoming.org/tag/Seminar.

When the request is received, the Event Application compares the attribute against the tags in Events Repository. For example, the Event Application may perform a lookup of Table 316 to determine if the specified attribute/tag is listed within the Events Repository 310 and if so, to determine which Tag IDs are associated with the tag. Next, the Event Application 102 determines which Event IDs are associated with the particular Tag ID and causes the event information for the particular Event IDs to display to a user.

Figure 3C:
FIG. 3C is a graphical user interface screen for displaying event search results based on tag data according to one embodiment of the invention.

For example, according to one embodiment, the word Seminar is associated with Tag ID 2. Tag ID 2 is associated with Event ID 1; therefore, event information for Event ID 1 is displayed to a user. In other embodiments, however, assume that multiple events are associated with the word "Seminar." Thus, referring now to FIG. 3C, a GUI screen displaying the results of a search for events associated with the "Seminar" tag is shown. According to FIG. 3B, Event ID 1, corresponding to the "Techleaders . . . " event is associated with Tag ID 2 in table 314. Hence, when Event Application 102 queries for all events associated with the Tag ID 2, corresponding to the tag "Seminar," the Events Repository 310 responds with data identifying Event ID 1 as one such event. In response, the Event Application 102 causes the GUI screen of FIG. 3C to display to the user. Using the GUI screen, the user may select and view information of any of the listed events.

According to another embodiment, when a user requests event information, the Event Application 102 retrieves only those events which occur in particular time frame. For example, if today's date was Mar. 1, 2006, the Event Application 102 may only retrieve information defining events that have a date or time of Mar. 1, 2006 or later. In order to determine which events occur in the particular time range, the Event Application 102 may simply inspect the Time column of Table 312 to determine if any event records take place within the particular time range.

Popular Tag Searching

Figure 3D:
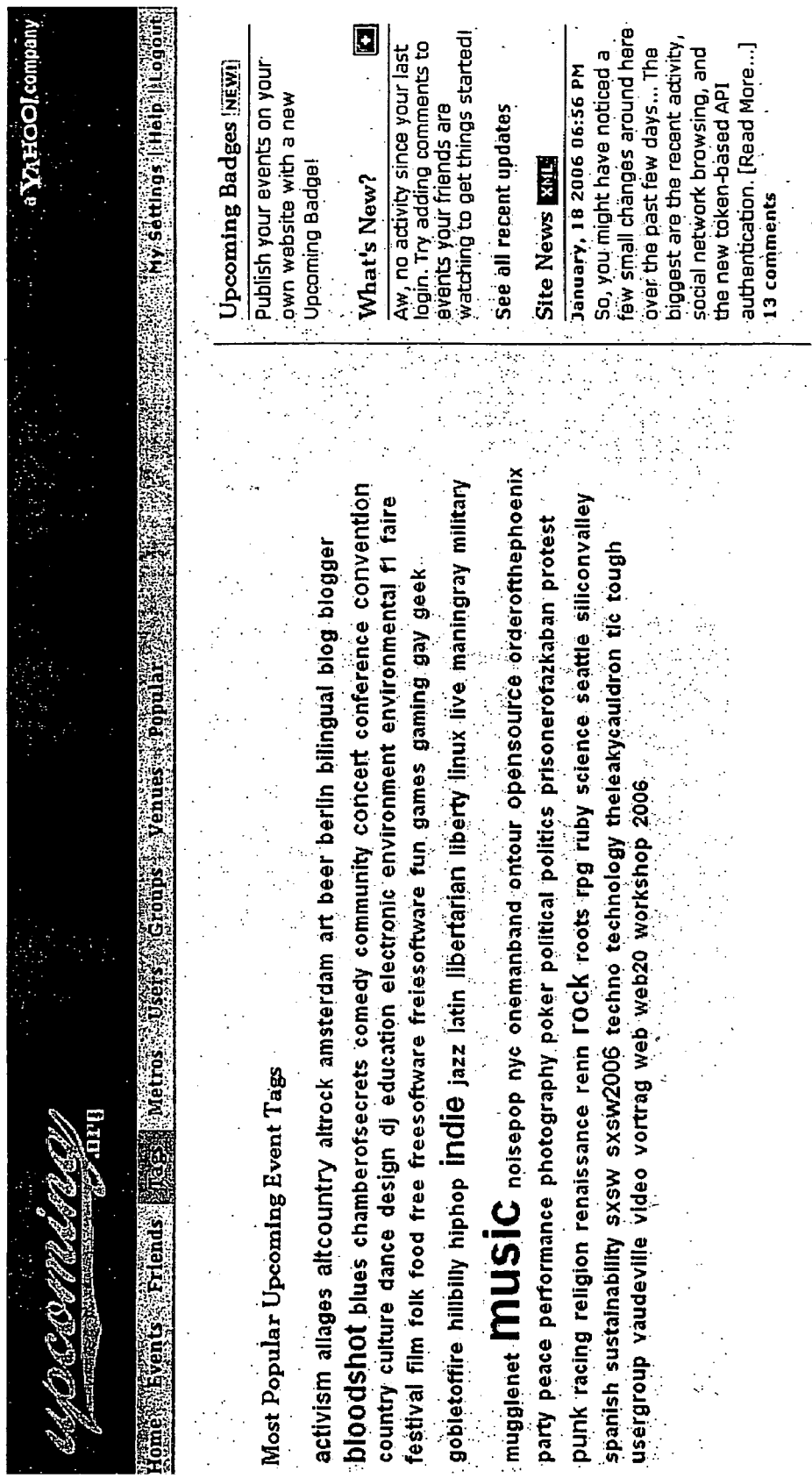
FIG. 3D is a graphical user interface screen for displaying popular event tags according to one embodiment of the invention.

Another way of using Table 316 is to display a "popular tags" page to users of the Event Application. For example, the Event Application can determine which Tags are associated with the most Event IDs. Referring now to FIG. 3D, a GUI screen of the Event Application displaying the most popular tags is shown. Tags that are associated with the most events appear in a larger font while Tags associated with the least events appear the smallest. The Event Application 102 may determine which tags are associated with the most events by performing a lookup of table 316 in Events Repository 310. According to table 314, the tag "Music" appears to be associated with the most Event IDs. Hence, in FIG. 3D, the Event Application 102 displays the tag "Music" in large letters on the GUI screen.

A user may use the GUI screen in FIG. 3D to view events associated with popular tags. Hence, if a user selects the "Music" tag on the GUI Screen of FIG. 3D, a listing of all events associated with the tag "Music" is shown s in FIG. 3E. Much like querying for events associated with the tag "Seminar," another way to access tags associated with the tag "Music" is via a simple HTTP URL call. In this instance, all events associated with the tag "Music" may be accessed by requesting the URL http://www.upcoming.org/tag/Music. Again, when displaying events associated with a popular tag to a user, the Event Application 102 may decide to only display events that have not yet taken place by inspecting the time column of any Event IDs that satisfy the search criteria.

Additionally, in other embodiments, note that event information associated with tags may be displayed to a user based on additional filters. For example, if a user requests to view events associated with a particular tag Tag ID 1, the Event Application 102 may additionally filter the results by restricting the results to events that occur within the user's geographic location and/or events authored by the user's designated friends.

Normalized Tags

Note that when entering tags for events, users may vary the spelling and or punctuation of keywords or attributes. Therefore, according to one embodiment, tags within the Events Repository 310 may be normalized in order to provide more efficient querying and organization of tags. For example, table 316 contains a Raw Tag column. The Raw Tag column identifies the keywords or attributes as entered by users of the Event Application 102.

For example, note that Raw Tags entered for Tag ID 3 include different variations of an attribute. Specifically, the specific attribute is the geographic location of New York City. However, this attribute may be referred to in a number of ways, such as New York, New York City, N.Y.C., and the Big Apple, for example. All these different variations may be placed within the Raw Tag column of Tag ID 3, and may be normalized to the tag "nyc" within the Tag column. Hence, when a user enters "N.Y.C." as an attribute for an event, it is normalized to nyc within the Events Repository 310. Further, when a user searches for events associated with the attribute "N.Y.C." the Event Application 102 normalizes the attribute to "nyc", corresponding to Tag ID 3, and finds all Event IDs associated with Tag ID 3. Thus, the Events Repository 310 is not littered with multiple variations of the same attribute, and the Event Application 102 is able to provide consolidated results for multiple variations of the same attribute, thereby increasing the effectiveness of tag-based searches and queries.

Further, note that tags may be associated with other features of the Event Application 102. For example, tags may be associated with groups in order to further define attributes of user-groups as defined above.

Hardware Overview

Figure 4:
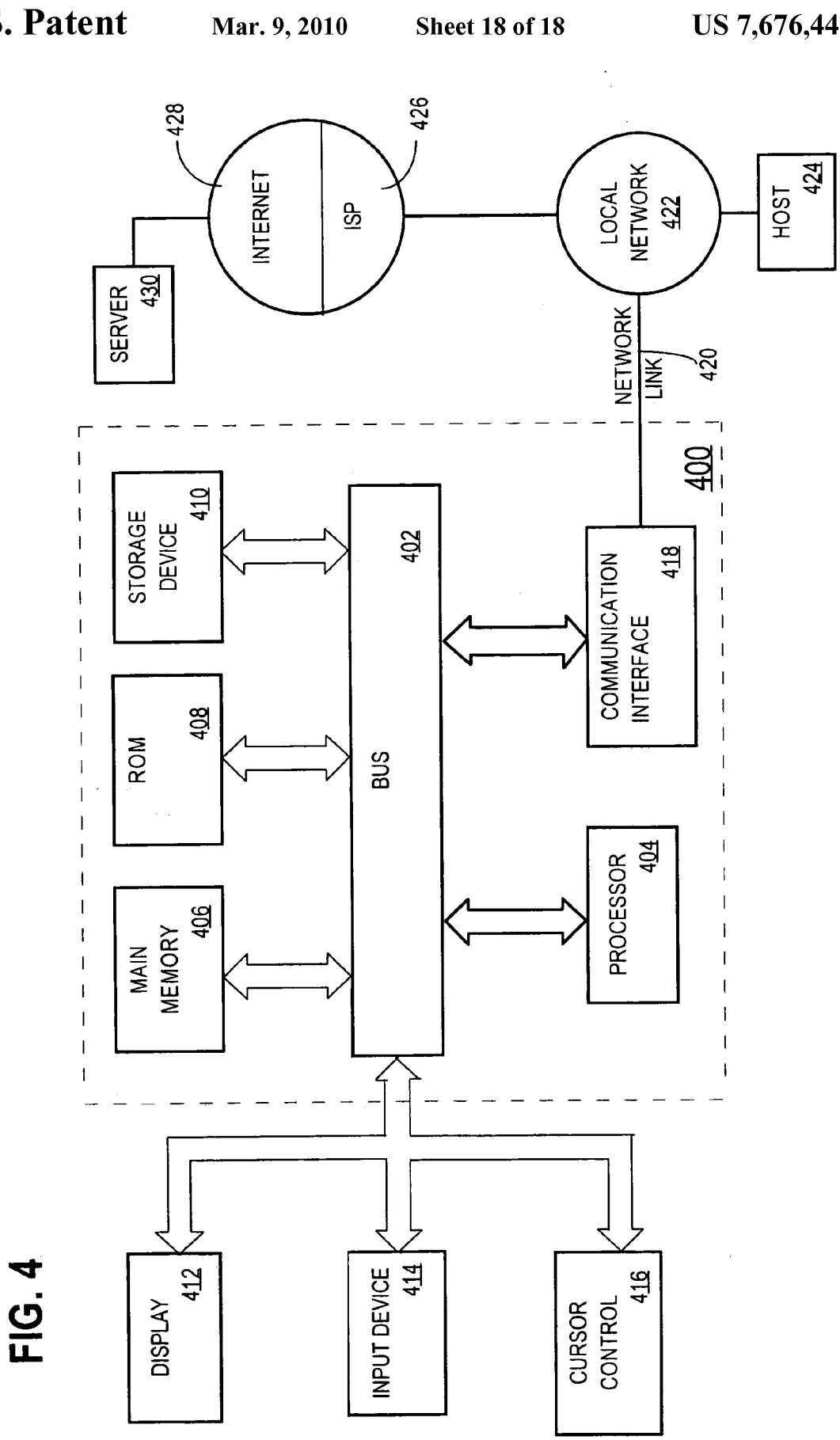
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:

providing an event repository that maintains event information for members of an online community, wherein the event information includes one or more event records that correspond to real world private events, wherein at least one of the one or more event records has an event id that is associated with a tag id, wherein each tag id is associated with a tag, and wherein each event record comprises structured information that: (i) identifies a first user of the online community as an event-author of a private event, and (ii) is restricted to only a group of one or more friends of the event-author in the online community;

receiving from a second user of the online community, who is in the group of one or more friends of the first user, a user-designated tag of unstructured metadata, wherein the user-designed tag provides information about a first event record;

without modifying the first event record, storing in the event repository, separate from the first event record: (i) the user-designated tag; (ii) an association between the user-designated tag and a tag id; and (iii) an association between the tag id and an event id;

receiving from the second user of the online community, a request for retrieving event information, wherein the request specifies a term that matches the user-designated tag;

as a result of the request, performing the steps of:

searching the event repository for a plurality of event records that are associated with any user-designed tags that match the term, wherein the plurality of records includes the first event record; and returning event information extracted from the plurality of event records to the second user of the online community;

wherein the computer-implemented method is performed by one or more computing devices.

2. The computer-implemented method of claim 1, further comprising:

after the association between the tag id and the event id has been established, receiving from a third user of the online community, who is not in the group of one or more friends of the first user, a second request for retrieving event information, wherein the second request specifies a second term that matches the user-designated tag;

as a result of the second request, performing the steps of:

searching the event repository for a second plurality of event records that are associated with any user-designed tags that match the term, wherein the second plurality of records does not include the first event record; and returning second event information extracted from the second plurality of event records to the third user of the online community.

3. The computer-implemented method of claim 1, wherein:

the request is associated with one or more event conditions; and wherein the computer-implemented method further comprises the step of determining that the private event satisfies the one or more event conditions.

4. The computer-implemented method of claim 3, wherein the one or more conditions include at least one of:

a time range;

an event-author; and a geographic location.

5. The computer-implemented method of claim 3 wherein:

the private event is one of a plurality of private events authored by said event-author;

the plurality of private events include a second private event that satisfies said one or more event conditions, wherein stored authorization viewer information specifies that the second private event is viewable to one or more third friends of said event-author and wherein the second user is not one of the one or more third friends of said event-author;

the computer-implemented method further comprising determining, based on the stored authorized-viewer information, that the second user is not authorized to view the second private event; and the information transmitted to the second user in response to the request does not include information about the second private event.

6. The computer-implemented method of claim 3 wherein the information from the plurality of event records includes information about events that are not identified as private events and that otherwise satisfy the one or more conditions.

7. The computer-implemented method of claim 1, wherein the information from the plurality of event includes information about private events from additional event-authors who have authorized the second user to view their private events.

8. A volatile or non-volatile computer readable medium storing one or more sequences of instructions which, when executed by one or more processors, causes the one or more processors to perform:

providing an event repository that maintains event information for members of an online community, wherein the event information includes one or more event records that correspond to real world private events, wherein at least one of the one or more event records has an event id that is associated with a tag id, wherein each tag id is associated with a tag, and wherein each event record comprises structured information that: (i) identifies a first user of the online community as an event-author of a private event, and (ii) is restricted to only a group of one or more friends of the event-author in the online community;

receiving from a second user of the online community, who is in the group of one or more friends of the first user, a user-designated tag of unstructured metadata, wherein the user-designed tag provides information about a first event record;

without modifying the first event record, storing in the event repository, separate from the first event record: (i) the user-designated tag; (ii) an association between the user-designated tag and a tag id; and (iii) an association between the tag id and an event id;

receiving from the second user of the online community, a request for retrieving event information, wherein the request specifies a term that matches the user-designated tag;

as a result of the request, performing the steps of:

searching the event repository for a plurality of event records that are associated with any user-designed tags that match the term, wherein the plurality of records includes the first event record; and returning event information extracted from the plurality of event records to the second user of the online community;

wherein the computer-implemented method is performed by one or more computing devices.

9. The medium of claim 8, wherein the one or more sequences of instructions further comprise instructions which, when executed by one or more processors, causes the one or more processors to perform:

after the association between the tag id and the event id has been established, receiving from a third user of the online community, who is not in the group of one or more friends of the first user, a second request for retrieving event information, wherein the second request specifies a second term that matches the user-designated tag;

as a result of the second request, performing the steps of:

searching the event repository for a second plurality of event records that are associated with any user-designed tags that match the term, wherein the second plurality of records does not include the first event record; and returning second event information extracted from the second plurality of event records to the third user of the online community.

10. The medium of claim 8, wherein:

the request is associated with one or more event conditions; and wherein the one or more sequences of instructions further comprise instructions which, when executed by one or more processors, causes the one or more processors to perform determining that the private event satisfies the one or more event conditions.

11. The medium of claim 10, wherein the one or more conditions include at least one of:

a time range;

an event-author; and a geographic location.

12. The medium of claim 10 wherein:

the private event is one of a plurality of private events authored by said event-author;

the plurality of private events include a second private event that satisfies said one or more event conditions, wherein stored authorization viewer information specifies that the second private event is viewable to one or more third friends of said event-author and wherein the second user is not one of the one or more third friends of said event-author;

wherein the one or more sequences of instructions further comprise instructions which, when executed by one or more processors, causes the one or more processors to perform determining, based on the stored authorized-viewer information, that the second user is not authorized to view the second private event; and the information transmitted to the second user in response to the request does not include information about the second private event.

13. The medium of claim 10 wherein the information from the plurality of event records includes information about events that are not identified as private events and that otherwise satisfy the one or more conditions.

14. The medium of claim 8, wherein the information from the plurality of event includes information about private events from additional event-authors who have authorized the second user to view their private events.

* * * * *